(12) United States Patent
Wevita et al.

(10) Patent No.: US 11,480,501 B2
(45) Date of Patent: Oct. 25, 2022

(54) DIAGNOSIS DEVICE AND DIAGNOSIS METHOD FOR PLANT

(71) Applicant: Mitsubishi Hitachi Power Systems, Ltd., Kanagawa (JP)

(72) Inventors: Pradeepa Lakmal Wevita, Yokohama (JP); Fumitoshi Sakata, Yokohama (JP); Ichiro Matsumoto, Yokohama (JP); Hiroshi Nagai, Tokyo (JP); Takehiro Kitta, Tokyo (JP); Takashi Kuroishi, Yokohama (JP); Hideki Tachibana, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 509 days.

(21) Appl. No.: 16/485,237

(22) PCT Filed: Jan. 16, 2018

(86) PCT No.: PCT/JP2018/000985
§ 371 (c)(1),
(2) Date: Aug. 12, 2019

(87) PCT Pub. No.: WO2018/150785
PCT Pub. Date: Aug. 23, 2018

(65) Prior Publication Data
US 2019/0368973 A1 Dec. 5, 2019

(30) Foreign Application Priority Data
Feb. 17, 2017 (JP) .............................. JP2017-027915

(51) Int. Cl.
*G06F 11/30* (2006.01)
*G21C 17/00* (2006.01)
(Continued)

(52) U.S. Cl.
CPC .......... *G01M 99/00* (2013.01); *G05B 19/048* (2013.01); *G05B 2219/2639* (2013.01)

(58) Field of Classification Search
CPC ................ G05B 23/024; G05B 19/048; G05B 2219/2639; G05B 23/0232;
(Continued)

(56) References Cited

U.S. PATENT DOCUMENTS 5,070,468 A * 12/1991 Niinomi ............. G05B 23/0235
702/185
10,573,421 B2 * 2/2020 Mashio ..................... G21C 9/00
(Continued)

FOREIGN PATENT DOCUMENTS

CN 102282516 12/2011
CN 103562810 2/2014
(Continued)

OTHER PUBLICATIONS

International Search Report dated Apr. 3, 2018 in International (PCT) Application No. PCT/JP2018/000985 with English translation.
(Continued)

*Primary Examiner* — Zhipeng Wang
(74) *Attorney, Agent, or Firm* — Wenderoth, Lind & Ponack, L.L.P.

(57) ABSTRACT

A diagnosis device for diagnosing a plant based on an operating state of the plant includes a monitoring data acquisition unit configured to acquire a plurality of monitoring data which are measurement values of a parameter related to the operating state of the plant measured at different times, a diagnosis target pattern generation unit configured to generate a diagnosis target pattern that is a plot pattern where each of the plurality of monitoring data is plotted against plant output data of the plant, and a pattern (Continued)

diagnosis unit configured to diagnose the plant based on the plot pattern of the diagnosis target pattern.

16 Claims, 11 Drawing Sheets

(51) Int. Cl.
*G01M 99/00* (2011.01)
*G05B 19/048* (2006.01)

(58) Field of Classification Search
CPC ............ G05B 23/0281; G05B 23/0208; G05B 23/0262; G01M 99/00
See application file for complete search history.

(56) References Cited

U.S. PATENT DOCUMENTS

| | | | |
|---|---|---|---|
| 2002/0007255 | A1 | 1/2002 | Fujita et al. |
| 2006/0212134 | A1 | 9/2006 | Dhawan |
| 2010/0198555 | A1* | 8/2010 | Takahama ............... F01D 19/00 702/179 |
| 2012/0041575 | A1* | 2/2012 | Maeda ................. G05B 23/024 700/80 |
| 2013/0132000 | A1* | 5/2013 | Tamaki ................... G06F 17/00 702/35 |
| 2014/0278237 | A1* | 9/2014 | Takahama ................. F02C 9/00 702/179 |
| 2014/0365195 | A1 | 12/2014 | Lahiri et al. |
| 2015/0100534 | A1* | 4/2015 | Ohtani ............... G05B 23/0281 706/46 |
| 2018/0190403 | A1* | 7/2018 | Mashio .................... G21C 9/00 |
| 2018/0335771 | A1 | 11/2018 | Rikkola et al. |

FOREIGN PATENT DOCUMENTS

| | | |
|---|---|---|
| CN | 106200616 | 12/2016 |
| JP | 04-093610 | 3/1992 |
| JP | 2000-352528 | 12/2000 |
| JP | 2010-282541 | 12/2010 |
| JP | 2011-107947 | 6/2011 |
| JP | 2011-243118 | 12/2011 |
| JP | 2013-137797 | 7/2013 |
| JP | 2015-75821 | 4/2015 |
| JP | 2015-103218 | 6/2015 |
| JP | 2015-232914 | 12/2015 |
| TW | 201510688 | 3/2015 |
| TW | 201640243 | 11/2016 |
| TW | 201642062 | 12/2016 |
| WO | 2009/107805 | 9/2009 |

OTHER PUBLICATIONS

International Preliminary Report on Patentability and Written Opinion of the International Searching Authority dated Aug. 29, 2019 in International (PCT) Application No. PCT/JP2018/000985 with English translation.
Taiwanese Office Action dated Nov. 6, 2018 in corresponding TW Application No. 107105468.
The Office Action dated May 4, 2021 in counterpart IN Application No. 201917032600 with Machine Translation.

* cited by examiner

DIAGNOSIS DEVICE AND DIAGNOSIS METHOD FOR PLANT

TECHNICAL FIELD

The present disclosure relates to a diagnosis device and a diagnosis method for diagnosing a plant based on an operating state of the plant.

BACKGROUND ART

In various plants such as gas turbine power plants, nuclear power plants, and chemical plants, state quantities of the plant such as temperature and pressure are acquired and monitored to monitor whether the plant is operating normally. For monitoring the plant, it is necessary to monitor multiple state quantities (monitoring data), and it takes a lot of skill to monitor the trend of state quantities to determine whether the plant is operating normally.

Therefore, conventionally, there are many monitoring techniques using a pattern recognition technique called MT method (Mahalanobis-Taguchi method) which allows one to relatively easily monitor the operating state of the plant even with a number of state quantities to be monitored (for instance, Patent Document 1). In the MT method, a normal group is defined as a unit space based on multivariate data, and a distance (Mahalanobis distance) from the unit space to target data is measured to determine abnormality. With this method, it is possible to comprehensively diagnose the plant only with a single index, namely, the Mahalanobis distance. Further, compared with a technique which performs diagnosis based on determination whether each operational parameter is below a control value, the MT method can detect abnormality early before damage of devices progresses and can prevent or minimize damage of devices in advance. Patent Document 1 describes that the Mahalanobis distance is substantially at most 4 when the average value of the unit space is 1 and the state quantity of the gas turbine power plant is normal, but when the state quantity of the gas turbine power plant is abnormal, the value of the Mahalanobis distance is increased in accordance with the degree of abnormality (distance from the unit space).

Patent Document 2 discloses a plant diagnosis device which forms some data groups (diagnosis models) in advance by a clustering technique using measurement signals measured for various states of a plant in a normal state and, if a processed measurement signal at diagnosis is not classified into any data group, diagnoses the plant as abnormal. This diagnosis is based on the characteristic that the property of a measurement signal when abnormality occurs in the plant differs from that in a normal state and thus the measurement signal diagnosed in an abnormal state is not classified into any data group formed using the measurement signals in a normal state.

CITATION LIST

Patent Literature

Patent Document 1: WO2009/107805A
Patent Document 2: JP2015-103218A

SUMMARY

Problems to be Solved

However, many state quantities have to be monitored for detecting abnormality of a plant, and there is a limit to accuracy of detecting abnormality by monitoring the plant with the MT method. Further, since the control value (threshold) of the Mahalanobis distance is set empirically, an abnormal state may be detected after the device damage progresses to some extent, depending on the control value of the Mahalanobis distance. Therefore, it is desired to increase accuracy of detecting abnormality of a plant and further improve abnormality detection performance, for instance, to detect a sign of abnormality earlier.

In view of the above, an object of at least one embodiment of the present invention is to provide a diagnosis device for a plant with improved abnormality detection performance.

Solution to the Problems (1) According to at least one embodiment of the present invention, a diagnosis device for diagnosing a plant based on an operating state of the plant comprises: a monitoring data acquisition unit configured to acquire a plurality of monitoring data which are measurement values of a parameter related to the operating state of the plant measured at different times; a diagnosis target pattern generation unit configured to generate a diagnosis target pattern that is a plot pattern where each of the plurality of monitoring data is plotted against plant output data of the plant; and a pattern diagnosis unit configured to diagnose the plant based on the plot pattern of the diagnosis target pattern.

With the above configuration (1), a diagnosis target pattern indicating a relationship between the plurality of monitoring data and the output data of the plant (e.g., power output data in case of a power generation plant) as measured along the time axis is generated, and the plant is diagnosed based on the plot pattern (overall shape of plots) of the diagnosis target pattern. The present inventors have found that, when abnormality occurs in the plant, the above-described diagnosis target pattern has a plot pattern different from the normal time. That is, they have found that when some abnormality occurs in the plant, a specific plot pattern (abnormal characteristic plot pattern described later) by which abnormality of the plant is identifiable appears at least partially in the diagnosis target pattern. Accordingly, it is possible to diagnose the plant based on the plot pattern of the diagnosis target pattern.

Further, for instance, a method which diagnoses the plant by comparing the monitoring data with an abnormal determination threshold empirically set cannot detect abnormality until the monitoring data exceeds the abnormal determination threshold even if abnormality actually occurs. Further, this method requires a relatively long time to detect abnormality since abnormality is not detected until the value of the monitoring data changes upon occurrence of abnormality and finally exceeds the abnormal determination threshold. By contrast, diagnosis based on the plot pattern of the diagnosis target pattern as described above makes it possible to detect abnormality even if the monitoring data does not exceed the abnormal determination threshold while abnormality actually occurs. Therefore, by diagnosing the plant based on the plot pattern of the diagnosis target pattern, it is possible to improve accuracy of detecting abnormality of the plant, detect a sign of abnormality earlier and reduce a time required for detecting abnormality after occurrence of abnormality, and thus it is possible to dramatically improve abnormality detection performance.

(2) In some embodiments, in the above configuration (1), the pattern diagnosis unit includes an abnormality diagnosis unit configured to diagnose the plant as abnormal if it is determined that the diagnosis target pattern has a predetermined abnormal characteristic plot pattern that is a specific plot pattern by which abnormality of the plant is identifiable.

With the above configuration (2), by determining whether the diagnosis target pattern has the predetermined abnormal characteristic plot pattern, it is possible to detect abnormality of the plant.

(3) In some embodiments, in the above configuration (2), the abnormality diagnosis unit is configured to determine that the diagnosis target pattern has the abnormal characteristic plot pattern if the diagnosis target pattern has a plot pattern with at least a predetermined degree of similarity to the abnormal characteristic plot pattern.

With the above configuration (3), it is possible to determine whether the diagnosis target pattern has the abnormal characteristic plot pattern based on the degree of similarity.

(4) In some embodiments, in any one of the above configurations (1) to (3), the diagnosis device further comprises an operating pattern classification unit configured to classify each of the plurality of monitoring data according to a predetermined operating pattern of the plant, and the diagnosis target pattern generation unit generates the diagnosis target pattern for each operating pattern.

With the above configuration (4), abnormality of the plant is diagnosed based on the plot pattern for each operating pattern of the diagnosis target pattern. By diagnosis based on the diagnosis target pattern for each operating pattern, it is possible to avoid the plot pattern formed of the operating pattern to be diagnosed being buried in the plurality of monitoring data belonging to the other operating pattern, and it is possible to surely make the abnormal characteristic plot pattern to appear. Thus, it is possible to further improve the diagnosis accuracy.

(5) In some embodiments, in the above configuration (4), the diagnosis device further comprises a threshold diagnosis unit configured to diagnose the plant based on comparison between each of the plurality of monitoring data and a threshold.

With the above configuration (5), the diagnosis method for the plant includes, in addition to the pattern diagnosis unit, the threshold diagnosis unit which diagnoses the plant based on a threshold range. Thereby, it is possible to more reliably detect abnormality of the plant. That is, although the pattern diagnosis unit cannot detect abnormality until the abnormal characteristic plot pattern is recognized as indicating abnormality even if the diagnosis target pattern has the abnormal characteristic plot pattern, the threshold diagnosis unit can detect such abnormality.

(6) In some embodiments, in the above configuration (5), the diagnosis device further comprises a diagnosis target pattern storage unit configured to store the diagnosis target pattern generated for each operating pattern if the plant is not diagnosed as abnormal by the pattern diagnosis unit but is diagnosed as abnormal by the threshold diagnosis unit.

With the above configuration (6), the diagnosis target pattern with abnormality detected by the threshold diagnosis unit but not detected by the pattern diagnosis unit is stored (saved). Thus, by learning the abnormal characteristic plot pattern based on the diagnosis target pattern through machine learning, for instance, it is possible to improve the diagnosis accuracy by the pattern diagnosis unit, and it is possible to improve the diagnosis accuracy for the plant.

(7) In some embodiments, in any one of the above configurations (4) to (6), the plant includes a plurality of devices, and the operating pattern is set based on an operating state of a target device including at least one of the plurality of devices.

With the above configuration (7), at least one operating pattern is determined based on combination of the operating state of the target device (e.g., boiler, at least one mill device, soot blower) selected from the plurality of devices constituting the plant. By determining at least one operating pattern based on the operating state of the target device, it is possible to generate the diagnosis target pattern having the abnormal characteristic plot pattern at the abnormal time.

(8) In some embodiments, in any one of the above configurations (1) to (7), the plant is a power generation plant including a generator.

With the above configuration (8), it is possible to provide a diagnosis method which enables diagnosis of the power generation plant.

(9) According to at least one embodiment of the present invention, a diagnosis method for diagnosing a plant based on an operating state of the plant comprises: a monitoring data acquisition step of acquiring a plurality of monitoring data which are measurement values of a parameter related to the operating state of the plant measured at different times; a diagnosis target pattern generation step of generating a diagnosis target pattern that is a plot pattern obtained by plotting each of the plurality of monitoring data against plant output data of the plant; and a pattern diagnosis step of diagnosing the plant based on the plot pattern of the diagnosis target pattern.

With the above configuration (9), it is possible to achieve the same effect as the above (1).

(10) In some embodiments, in the above configuration (9), the pattern diagnosis step includes an abnormality diagnosis step of diagnosing the plant as abnormal if it is determined that the diagnosis target pattern has a predetermined abnormal characteristic plot pattern that is a specific plot pattern by which abnormality of the plant is identifiable.

With the above configuration (10), it is possible to achieve the same effect as the above (2).

(11) In some embodiments, in the above configuration (10), the abnormality diagnosis step includes determining that the diagnosis target pattern has the abnormal characteristic plot pattern if the diagnosis target pattern has a plot pattern with at least a predetermined degree of similarity to the abnormal characteristic plot pattern.

With the above configuration (11), it is possible to achieve the same effect as the above (3).

(12) In some embodiments, in any one of the above configurations (9) to (11), the diagnosis method further comprises a monitoring data classification step of classifying each of the plurality of monitoring data according to a predetermined operating pattern of the plant, and the diagnosis target pattern generation step includes generating the diagnosis target pattern for each operating pattern.

With the above configuration (12), it is possible to achieve the same effect as the above (4).

(13) In some embodiments, in the above configuration (12), the diagnosis method further comprises a threshold diagnosis step of diagnosing the plant based on comparison between each of the plurality of monitoring data and a threshold.

With the above configuration (13), it is possible to achieve the same effect as the above (5).

(14) In some embodiments, in the above configuration (13), the diagnosis method further comprises a diagnosis target pattern storage step of storing the diagnosis target pattern generated for each operating pattern if the plant is not diagnosed as abnormal in the pattern diagnosis step but is diagnosed as abnormal in the threshold diagnosis step.

With the above configuration (14), it is possible to achieve the same effect as the above (6).

(15) In some embodiments, in any one of the above configurations (12) to (14), the plant includes a plurality of devices, and the operating pattern is set based on an operating state of a target device including at least one of the plurality of devices.

With the above configuration (15), it is possible to achieve the same effect as the above (7).

(16) In some embodiments, in any one of the above configurations (9) to (15), the plant is a power generation plant including a generator.

With the above configuration (16), it is possible to achieve the same effect as the above (8).

Advantageous Effects

According to at least one embodiment of the present invention, there is provided a diagnosis device for a plant with improved abnormality detection performance.

BRIEF DESCRIPTION OF DRAWINGS

FIG. 9 is a diagram showing a plot pattern at the normal time corresponding to the diagnosis target pattern of FIG. 8, in which FIG. 6 is shown according to the operating pattern.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
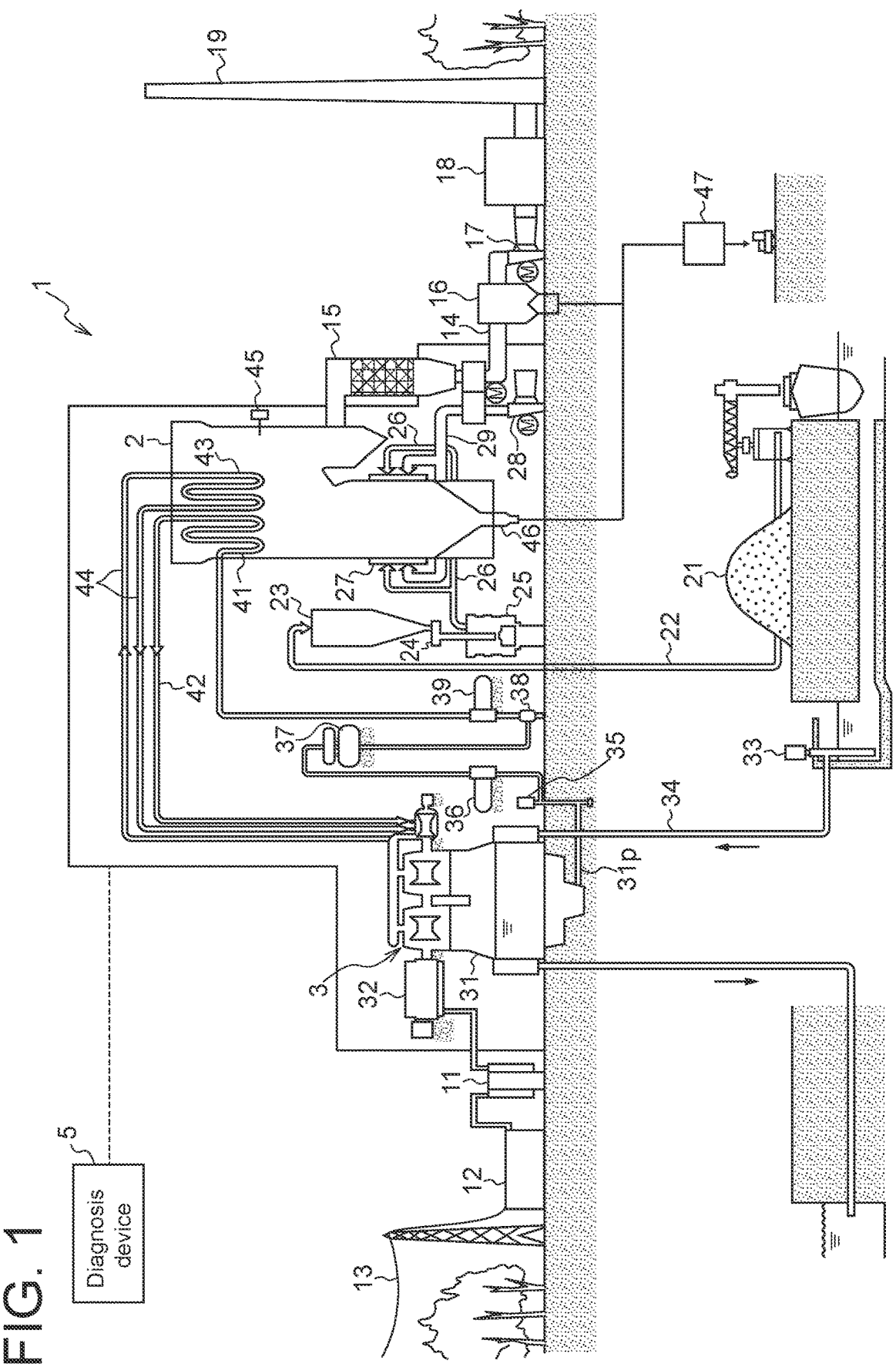
FIG. 1 is a schematic configuration diagram of a plant according to an embodiment of the present invention.

FIG. 1 is a schematic configuration diagram of a plant 1 according to an embodiment of the present invention. The plant 1 shown in FIG. 1 is an example of a general thermal power station (power generation plant) in which a fluid flowing through a heat-transfer tube 41 or the like disposed inside a boiler 2 is heated by combustion of fuel in the boiler 2, and a resulting main steam is supplied to a steam turbine 3 to rotationally drive the steam turbine 3 and thereby drive a generator 32, thus generating power. The generated power is converted by a main transformer 11 into high voltage and sent to a transmission line 13 via a switch gear 12 and sent to consumption place.

More specifically, in the embodiment shown in FIG. 1, coal (fuel) input from a coal yard 21 to a coal bunker 23 by a conveyor belt 22 is supplied to a burner 27 through a coal feeder 24, a mill device 25 (coal pulverizer), and a pulverized coal pipe 26, while air (secondary air) is supplied to the boiler 2 through a secondary air supply pipe 29 by a forced draft fan 28, to perform combustion in the boiler 2.

Further, a main steam produced at the heat-transfer tube 41 in the boiler 2 passes through a main steam pipe 42 and rotationally drives the steam turbine 3. Then, the main steam is introduced into a condenser 31 and therein cooled by cooling water supplied to the condenser 31 through a cooling water channel 34 by a circulation pump 33. Then, the condensate is drawn from the condenser 31 by a condensate pump 35, passes through a water supply pipe 31p, and is circulated to the heat-transfer tube 41 through a low-pressure water supply heater 36, a deaerator 37, a water supply pump 38, and high-pressure water supply heater 39 disposed in the water supply pipe 31p. The boiler 2 also contains a re-heater 43, and the main steam from the steam turbine 3 passing through a re-heat pipe 44 is re-heated by the re-heater 43 and is supplied to the steam turbine 3 again. Further, the boiler 2 has a soot blower 45 for removing soot and dust adhering to the heat exchanger such as the heat-transfer tube 41 and the re-heater 43.

On the other hand, exhaust gas produced by combustion of fuel in the boiler 2 is detoxified by a denitration device 15 for removing nitrogen oxide from the exhaust gas, an electric precipitator 16 for removing soot and dust in the exhaust gas, and a desulfurization device 18 for removing sulfur oxide in the exhaust gas after removing dust disposed in a duct 14 while being drawn by an induced draft fan 17, and then is discharged to ambient air through a stack 19. Further, ash produced in the boiler 2 is discharged from the bottom of the boiler 2, then sent to an ash processing facility 47 through a clinker hopper 46, and discharged to the outside. Also, dust collected by the electric precipitator 16 is sent to the ash processing facility 47 and then discharged to the outside.

As described above, the plant 1 such as a power generation plant is composed of multiple devices (11 to 44), and plant output, such as power output (output power of the generator 32) in case of the power generation plant, is obtained by operating each device normally. However, the plant 1 may be composed of a single device.

Further, at least one parameter (state quantity) of the plant 1 is measured (monitored) by state quantity monitoring means such as a sensor at constant cycle, for instance at intervals of 1 minute, and the parameter is used for control of the plant 1 and monitoring of the operational state of the plant 1. In the boiler 2, the parameter may be, for instance, temperature, pressure, and flow rate of steam and pressure. In the steam turbine 3, the parameter may be vibration, rotational speed, and opening degree of a valve and a damper. In the forced draft fan 28 and the induced draft fan 17, the parameter may be current, voltage, and temperature of respective drive motors M. In the generator 32, the parameter may be temperature and pressure of lubricant oil, output power, voltage, active power, and reactive power. The parameter may be concentration of SOx, NOx, and $O_2$ flowing through the duct 14. Additionally, in the embodiment shown in FIG. 1, on-off signals of valves of devices such as the mill device 25, the soot blower 45, and the coal bunker 23 are also measured (monitored) as the parameter.

Figure 2:
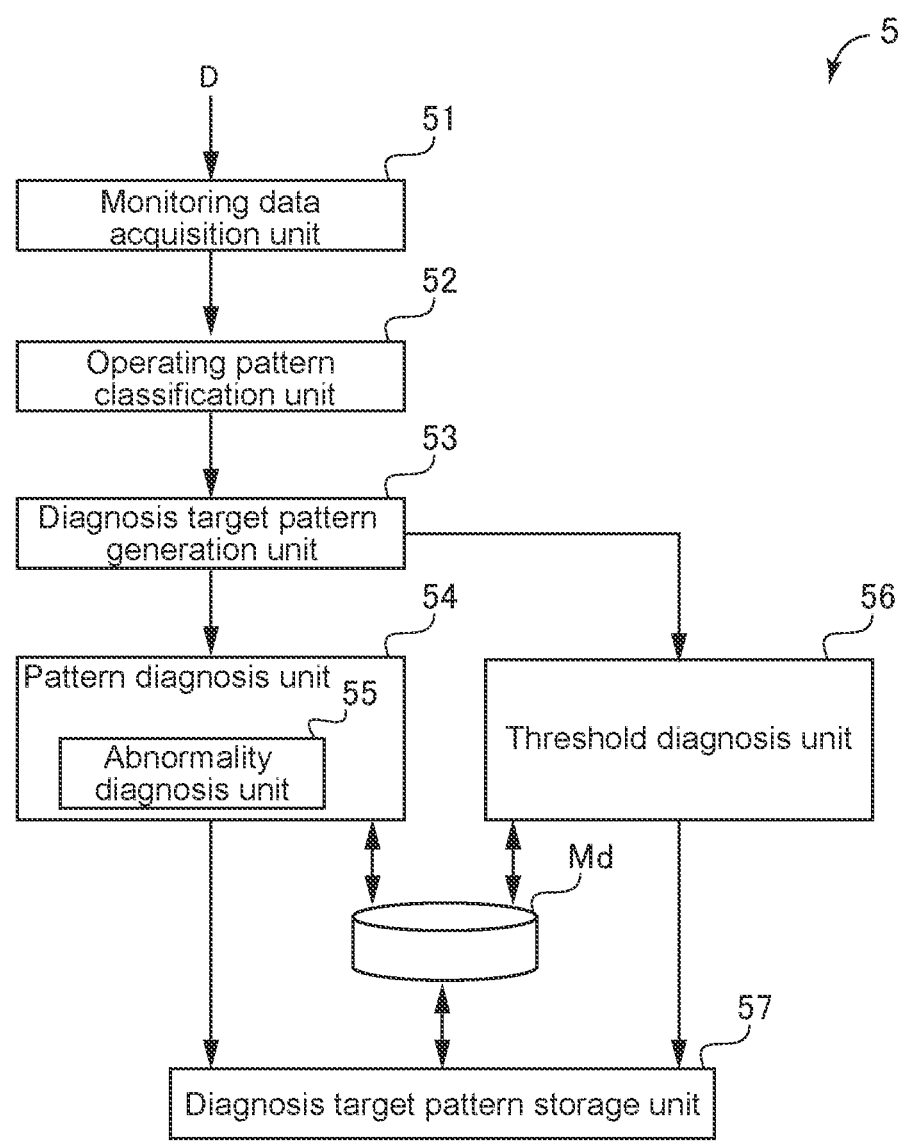
FIG. 2 is a diagram of a diagnosis device for a plant according to an embodiment of the present invention.
Figure 3:
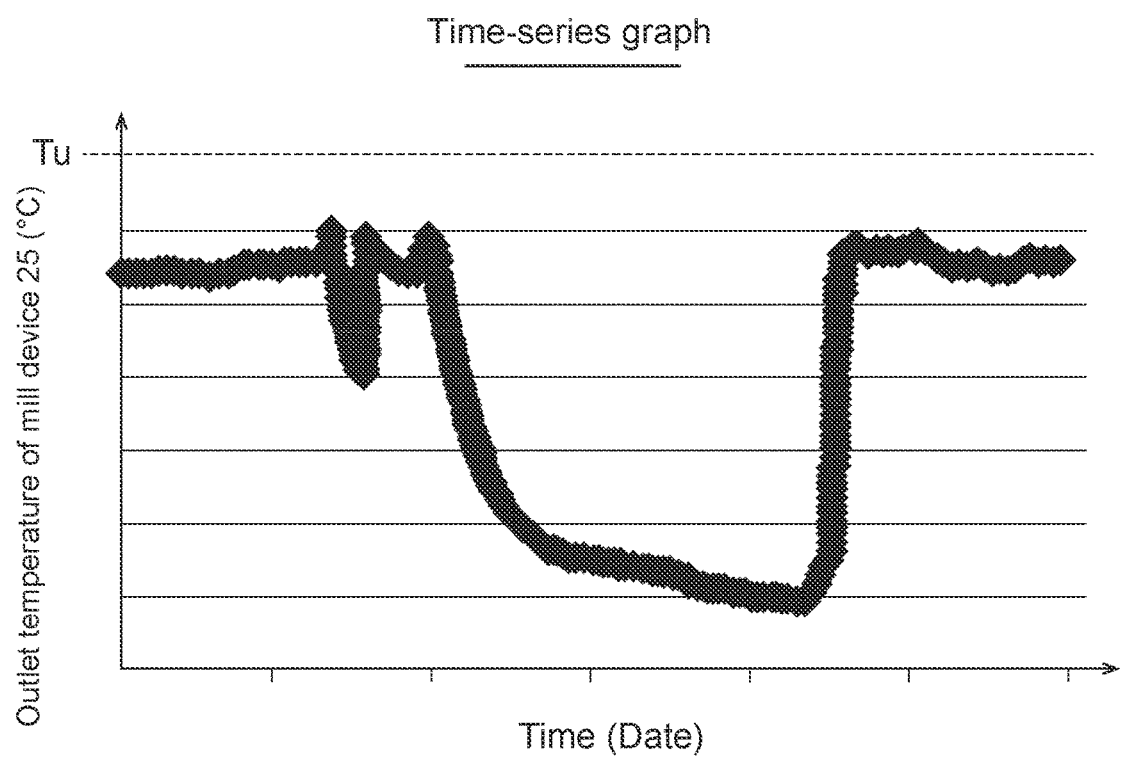
FIG. 3 is an example of a time-series graph of a parameter related to the operating state of a plant according to an embodiment of the present invention, where the parameter is outlet temperature of a mill device.
Figure 4:
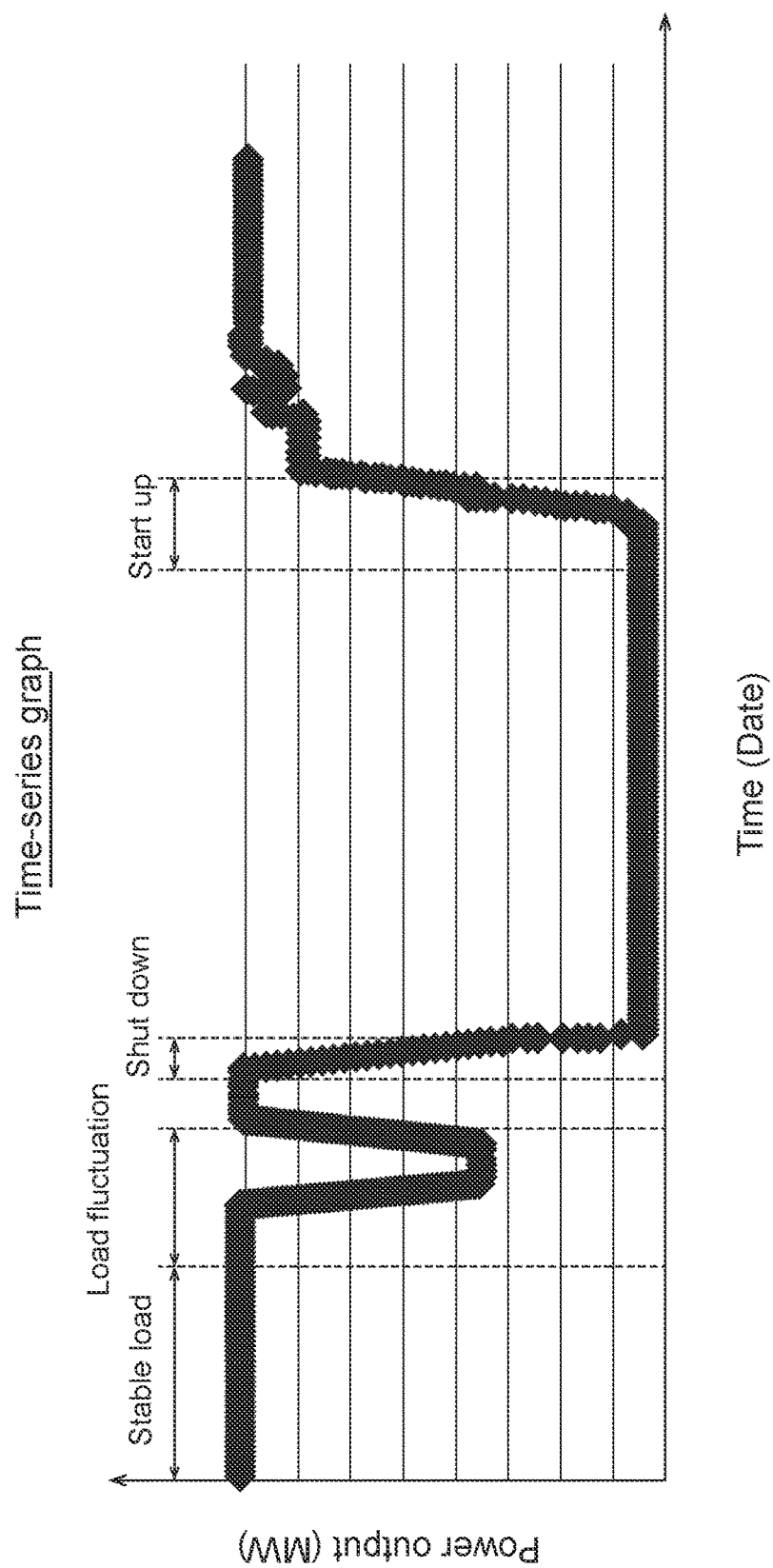
FIG. 4 is a time-series graph of power output (plant output) according to an embodiment of the present invention.
Figure 5:
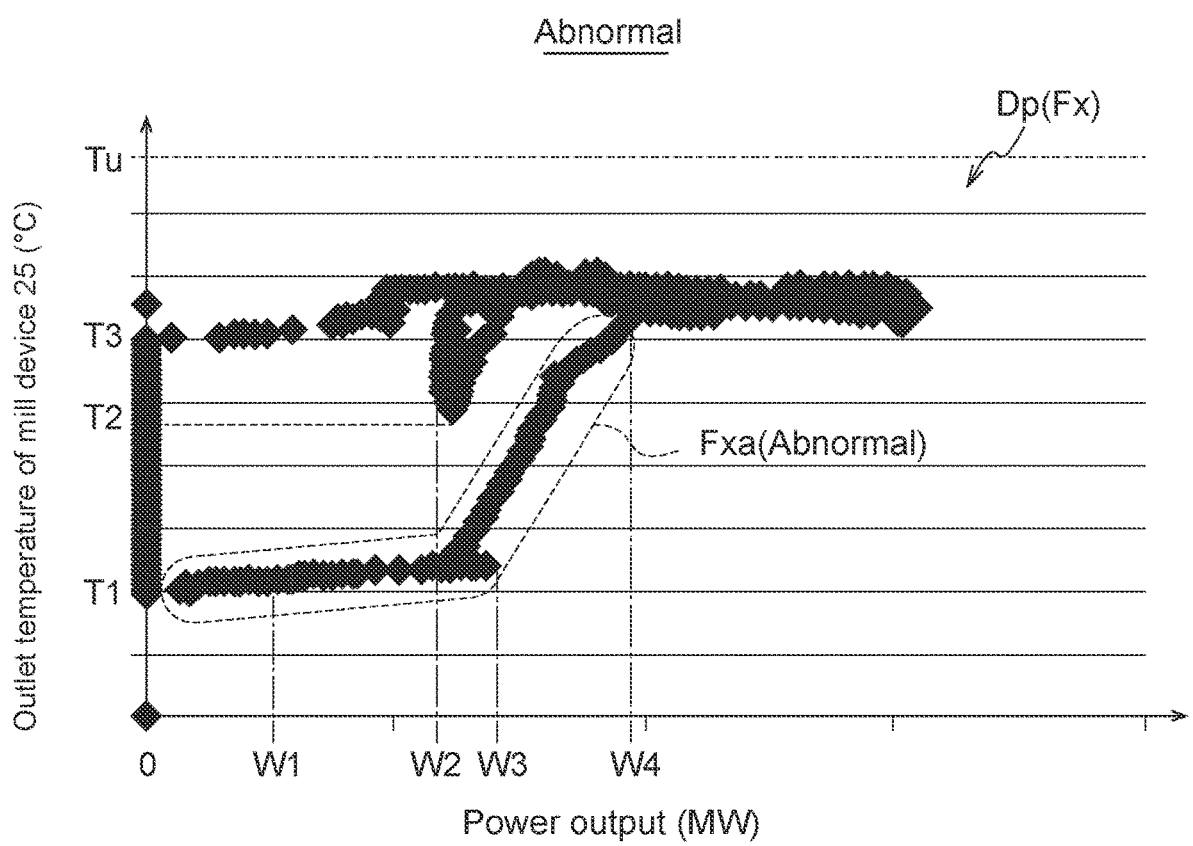
FIG. 5 shows a diagnosis target pattern according to an embodiment of the present invention, formed based on FIG. 3.
Figure 6:
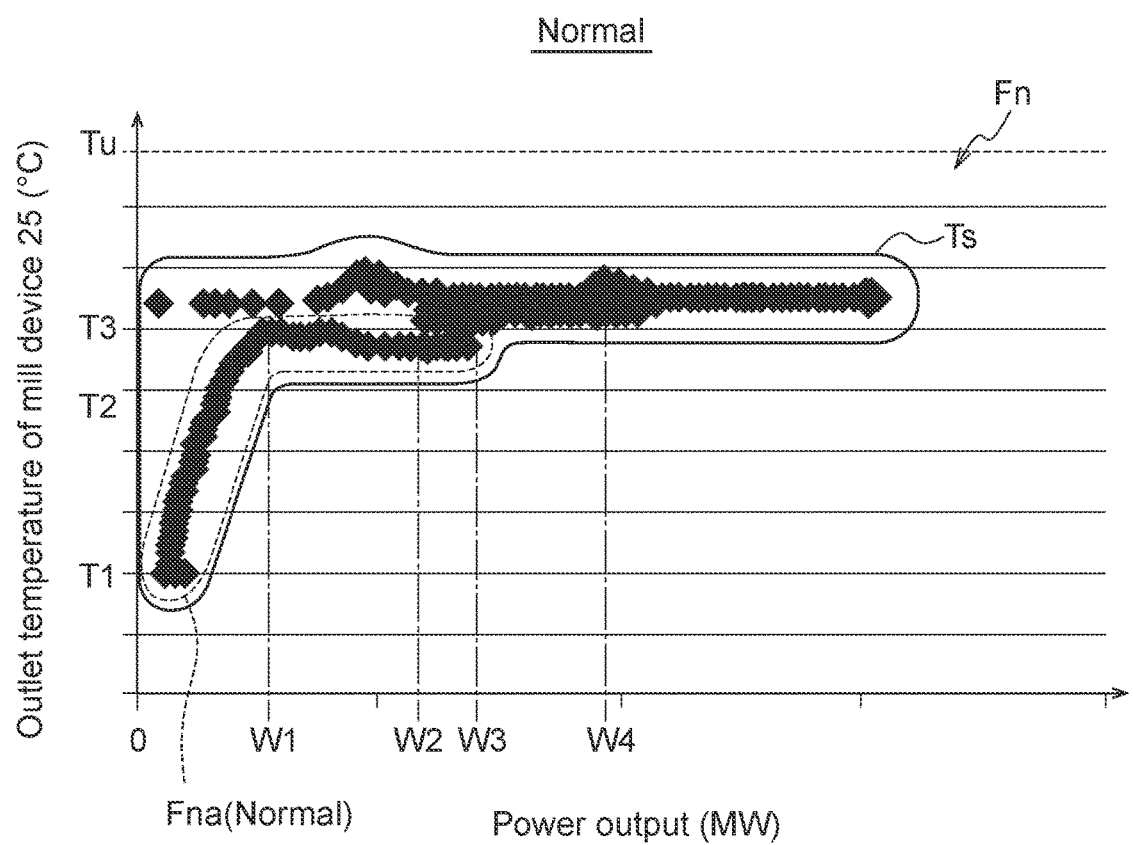
FIG. 6 is a diagram showing a plot pattern at the normal time corresponding to the diagnosis target pattern of FIG. 5.
Figure 7:
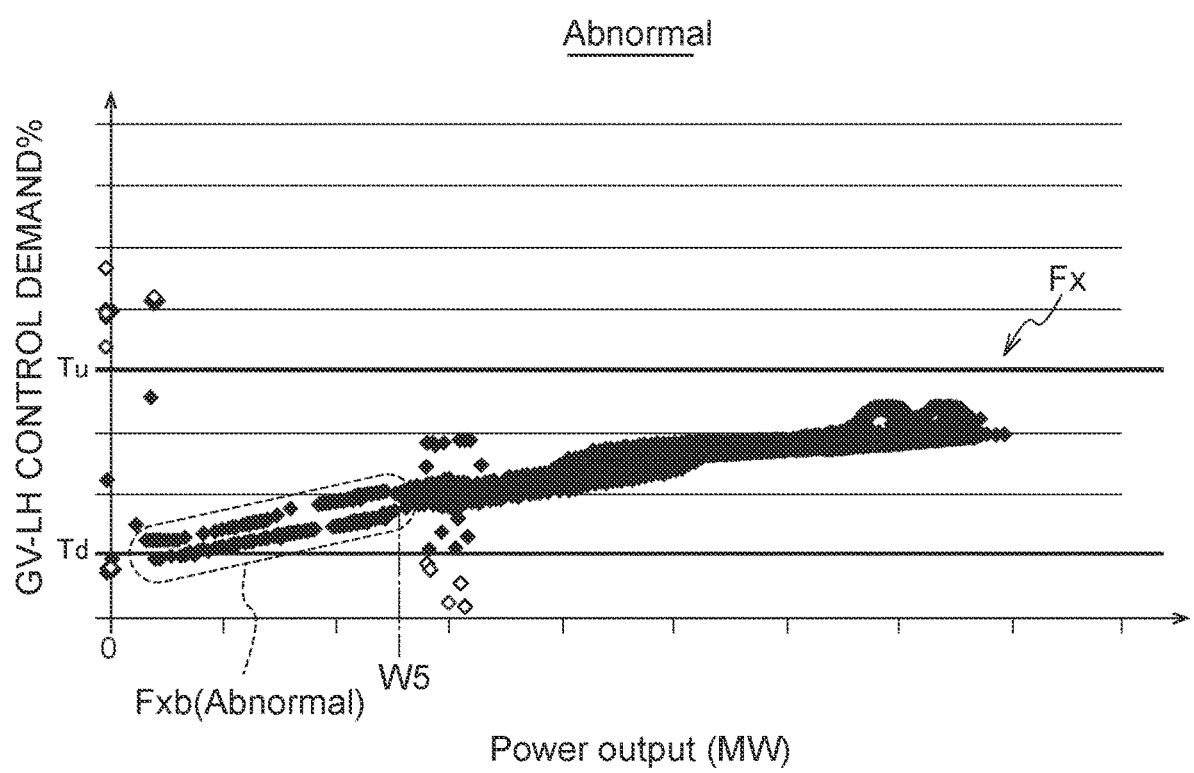
FIG. 7 shows an example of a diagnosis target pattern (at the abnormal time) of GV-LH control demand (%) which is a parameter related to the operating state of a plant according to an embodiment of the present invention.

Further, as shown in FIG. 1, the plant 1 includes a diagnosis device 5 for the plant 1 (hereinafter, simply referred to as diagnosis device 5). The diagnosis device 5 is a device for diagnosing the plant 1 based on the operating state of the plant 1. In the embodiment shown in FIG. 1, the diagnosis device 5 is disposed in a place, such as a central control room, distant from the plant 1. The diagnosis device 5 will now be described with reference to FIGS. 2 to 7. FIG. 2 is a diagram of the diagnosis device 5 for the plant 1 according to an embodiment of the present invention. FIG. 3 is an example of a time-series graph of a parameter related to the operating state of the plant 1 according to an embodiment of the present invention, where the parameter is outlet temperature of the mill device 25. FIG. 4 is a time-series graph of power output (plant output) according to an embodiment of the present invention. FIG. 5 shows a diagnosis target pattern Dp according to an embodiment of the present invention, formed based on FIG. 3. FIG. 6 is a diagram showing a plot pattern F (Fn) at the normal time corresponding to the diagnosis target pattern Dp of FIG. 5. FIG. 7 shows an example of a diagnosis target pattern Dp (at the abnormal time) of GV-LH control demand (%) which is a parameter related to the operating state of the plant 1 according to an embodiment of the present invention.

As shown in FIG. 2, the diagnosis device 5 includes a monitoring data acquisition unit 51, a diagnosis target pattern generation unit 53, and a pattern diagnosis unit 54. Each functional unit will now be described. The diagnosis device 5 may be composed of a computer and include a CPU (processor, not shown), a memory such as ROM and RAM, an auxiliary storage device (storage device Md), and an external communication interface. The CPU operates (e.g. computation of data) in accordance with instructions of a program (diagnosis program for the plant 1) loaded to a main storage device, and thereby the above functional units are implemented.

The monitoring data acquisition unit 51 acquires a plurality of monitoring data D which are measurement values of a parameter (state quantity) related to the operational state of the plant 1 measured at different times (see FIG. 3). That is, the monitoring data D is data of measurement values measured by the state quantity monitoring means along the time axis, and the monitoring data acquisition unit 51 inputs the monitoring data D related to at least one parameter into the device (program). For instance, the plurality of monitoring data D may be stored in the storage device Md of the diagnosis device 5 in advance, and the monitoring data acquisition unit 51 may read out a predetermined period's worth of data, for instance one day, three days, or one month's worth of data, from the storage device Md and may input the data into the program. Alternatively, the monitoring data acquisition unit 51 may acquire a predetermined period's worth of monitoring data D via an external communication interface. The predetermined period may be assigned by request (operation) of an operator who operates the diagnosis device 5 (diagnosis program). The measurement values of the parameter may be subjected to signal processing (post-processing) by moving average, a lowpass filter, or the like to be digitized into data. Further, the monitoring data acquisition unit 51 may filter (post-processing) and acquire only monitoring data D related to a necessary parameter (e.g., output temperature of the mill device 25 described later) from monitoring data D related to multiple types of parameters.

Further, when the plurality of monitoring data D acquired by the monitoring data acquisition unit 51 are plotted as time series as shown in FIG. 3, the value changes over time. In the example of FIG. 3, approximately 1 month's worth of the monitoring data D of outlet temperature (° C.) of the mill device 25, which is one of the parameters, are plotted as time series. The example of FIG. 3 corresponds to the case where the operating state of the plant 1 is abnormal, in which the outlet temperature of the mill device 25 is below a control value (upper limit threshold Tu) for detecting abnormality, as explained later.

The diagnosis target pattern generation unit 53 generates a diagnosis target pattern Dp (see FIG. 5) which is a plot pattern F where each of the plurality of monitoring data D is plotted against power output data (plant output data). There is a premise that each of the plurality of monitoring data D for the predetermined period as shown in FIG. 3 is associated with the power output data (e.g., megawatt) that is measured at the same time as the corresponding monitoring data D. That is, the measurement time, the monitoring data D, and the power output data are contained in one record, and the record generated with, for instance, periodic parameter measurement is collected for the predetermined period to form a record set. On the basis of the record set, the diagnosis target pattern generation unit 53 plots the plurality of monitoring data D related to a single parameter (for instance, outlet temperature of the mill device 25, described later) against the power output to generate the diagnosis target pattern Dp.

More specifically, the record set may be formed by liking the monitoring data D (FIG. 3) associated with measurement time to the power output data (FIG. 4) associated with measurement time according to the measurement time. The record set may be formed by the diagnosis target pattern generation unit 53, or the diagnosis target pattern generation unit 53 may receive the record set formed by another functional unit (e.g., a record set generation unit not shown). The respective measurement times of the parameter and the power output are regarded as coinciding even if they are different as long as it can reasonably be regarded that the two measurement timings correspond to each other.

The diagnosis target pattern Dp thus generated can be represented by a scatter plot with the horizontal axis representing the power output and the vertical axis representing the monitoring data D, as shown in FIG. 5, for instance. More specifically, in FIG. 5, the shape (geometry) of the set of all plots in the scatter plot is the plot pattern F, and the whole of the plot pattern F is the diagnosis target pattern Dp to be diagnosed. Herein, the plot pattern F also refers to the shape of at least a part of the whole plot pattern F. Further, the diagnosis target pattern Dp is generated for each parameter. The diagnosis target pattern Dp shown in FIG. 5 is one generated by plotting the outlet temperature of the mill device 25 against the power output.

The pattern diagnosis unit 54 diagnoses the plant 1 based on the plot pattern F of the diagnosis target pattern Dp. That is, the pattern diagnosis unit 54 diagnoses the operating state of the plant 1 as normal or abnormal based on the whole plot pattern F of the diagnosis target pattern Dp or a part of the plot pattern F (referred to as pattern portion) of the diagnosis target pattern Dp. This is based on finding by the inventors that at the abnormal time when abnormality occurs in the plant 1, the diagnosis target pattern Dp has a plot pattern F different from the normal time when the operating state of the plant 1 is normal. That is, they have found that when some abnormality occurs in the plant 1, a specific plot pattern F (abnormal characteristic plot pattern Fx described later) by which abnormality of the plant 1 is identifiable appears at least partially in the diagnosis target pattern Dp. According to this finding, in the present invention, the plant 1 is diagnosed based on the plot pattern F of the diagnosis target pattern Dp.

For instance, the diagnosis target pattern Dp shown in FIG. 5 is a diagnosis target pattern Dp generated based on the monitoring data D of the outlet temperature (parameter) of the mill device 25 at the abnormal time when some abnormality occurs in the plant 1. The diagnosis target pattern Dp of FIG. 5 has a plot pattern F in which the temperature is nearly T1 until the power output reaches W2 and the temperature increases to T3 linearly against the power output when the power output is between W2 to W4, and has a pattern portion (first abnormal pattern portion Fxa) which is convex downward.

By contrast, as shown in FIG. 6, the plot pattern F (normal pattern Fn) related to the outlet temperature of the mill device 25 when the operating state of the plant 1 is normal has a plot pattern F in which the temperature increases dramatically and logarithmically to T3 with increase in power output when the power output is between 0 to W1 and the temperature is nearly T3 when the power output is between W1 and W3, and has a pattern portion (first normal pattern portion Fna) which is convex upward.

The power output has a relationship of W1<W2<W3<W4, and the temperature has a relationship of T1<T2 (described later)<T3. Further, the normal pattern Fn may be stored in the storage device Md.

Comparing the diagnosis target pattern Dp (FIG. 5) with the normal pattern Fn (FIG. 6), it cannot be said that the first abnormal pattern portion Fxa (convex downward) is similar to the first normal pattern portion Fna of the FIG. 6, and due to this portion, even comparing the whole plot pattern F, it cannot be said that they are similar to each other. In this way, in comparison between the diagnosis target pattern Dp and the normal pattern Fn (FIG. 6) which is the plot pattern F (scatter plot) of the plant 1 in a normal state, if the diagnosis target pattern Dp has at least a predetermined degree of similarity to the normal pattern Fn, it can be determined that the plant 1 is normal (the operating state of the plant 1 is normal). Further, as described later, if it is determined that the diagnosis target pattern Dp has an abnormal characteristic plot pattern Fx described later, it can be determined that the plant 1 is abnormal (the operating state of the plant 1 is abnormal).

Further, for instance, as shown in FIG. 6, a control value Ts (threshold) may be set outside the outline of the normal pattern Fn so as to surround the normal plot pattern, and it may be determined that abnormality is present when the outline of the diagnosis target pattern Dp exceeds and extends beyond the control value. This method also makes it possible to determine that the diagnosis target pattern Dp of FIG. 5 differs from the normal pattern Fn, and if they differ, the diagnosis target pattern Dp is regarded as having the abnormal characteristic plot pattern Fx. The control value may be provided in conformance with the outline of the diagnosis target pattern Dp (FIG. 6). Further, two or more control values may be set stepwise. Specifically, an innermost control value may be a first control value, and a control value surrounding the first control value may be a second control value. The degree of progress of abnormality may be determined by whether the pattern exceeds the first control value or the second control value. In this case, the upper limit threshold Tu of FIG. 6 is a final control value.

When diagnosis by the diagnosis device 5 is compared with, for instance, a comparative method which diagnoses the plant 1 by comparing the monitoring data D with an abnormal determination threshold (e.g., upper limit threshold Tu) empirically set, the comparative method cannot detect abnormality until the monitoring data D exceeds the abnormal determination threshold even if abnormality actually occurs. Further, the comparative method may require a relatively long time to detect abnormality since abnormality is not detected until the value of the monitoring data D changes upon occurrence of abnormality and finally exceeds the abnormal determination threshold. By contrast, diagnosis based on the plot pattern F of the diagnosis target pattern Dp as described above makes it possible to detect abnormality even if the monitoring data D does not exceed the abnormal determination threshold (T1 of FIG. 5) while abnormality actually occurs.

Therefore, by diagnosing the plant 1 based on the plot pattern F of the diagnosis target pattern Dp, it is possible to improve accuracy of detecting abnormality of the plant 1, detect abnormality earlier and reduce a time required for detecting abnormality after occurrence of abnormality, and thus it is possible to dramatically improve abnormality detection performance.

Further, in some embodiments, as shown in FIGS. 5 and 7, the pattern diagnosis unit 54 includes an abnormality diagnosis unit 55 which diagnoses the plant 1 as abnormal if the diagnosis target pattern Dp has a predetermined abnormal characteristic plot pattern Fx which is a specific plot pattern F by which abnormality of the plant 1 is identifiable. For instance, the abnormal characteristic plot pattern Fx in the example of FIG. 5 is a pattern portion (first abnormal pattern portion Fxa) convex downward, which differs from a corresponding portion (first normal pattern portion Fna) of the normal pattern Fn, and the abnormal characteristic plot pattern Fx is the whole plot pattern F(Fx) including this first abnormal pattern portion Fxa. The abnormal characteristic plot pattern Fx may be stored in the storage device Md.

Another example of the abnormal characteristic plot pattern Fx is shown in FIG. 7. FIG. 7 shows an example of a diagnosis target pattern Dp (at the abnormal time) of GV-LH control demand (%) which is a parameter related to the operating state of the plant 1 according to an embodiment of the present invention. That is, FIG. 7 shows the diagnosis target pattern Dp generated based on the monitoring data D of the GV-LH control demand (parameter) at the abnormal time when some abnormality occurs in the plant 1. The diagnosis target pattern Dp (abnormal characteristic plot pattern Fx) of FIG. 7 has a plot pattern F (second abnormal pattern portion Fxb) like crocodile's mouth divided into two parts having different values of the vertical axis against the same power output in a region where the power output is small (region of W5 or less in FIG. 7), and the whole plot pattern F including the remaining portion is like crocodile with open mouth as depicted. The pattern portion (Fxb) corresponding to the crocodile's mouth does not appear in the normal pattern Fn (not shown) of the plant 1. Therefore, if the diagnosis target pattern Dp has the plot pattern (Fxb) corresponding to the crocodile's mouth, the plant 1 is diagnosed as abnormal.

With the above configuration, by determining whether the diagnosis target pattern Dp has the predetermined abnormal characteristic plot pattern Fx, it is possible to detect abnormality of the plant 1.

Further, in some embodiments, the abnormality diagnosis unit 55 determines that the diagnosis target pattern Dp has the abnormal characteristic plot pattern Fx if the diagnosis target pattern Dp has a plot pattern F with at least a predetermined degree of similarity to the abnormal characteristic plot pattern Fx. For instance, a known pattern matching technique may be used which allows one to determine whether the geometry of the plot pattern F of the diagnosis target pattern Dp coincides or not with the geometry of the abnormal characteristic plot pattern Fx or the normal pattern Fn (described above) based on the predetermined degree of similarity. Thus, with determination based on the degree of similarity, it is possible to improve the reliability of determination.

With the above configuration, it is possible to determine whether the diagnosis target pattern Dp has the abnormal characteristic plot pattern Fx based on the degree of similarity.

Further, in some embodiments, as shown in FIG. 2, the diagnosis device 5 may further include an operating pattern classification unit 52 which classifies each of the plurality of the monitoring data D according to a predetermined operating pattern Op of the plant 1. Further, the diagnosis target pattern generation unit 53 generates the diagnosis target pattern Dp for each operating pattern Op. That is, in the present embodiment, using the monitoring data D belonging to the same operating pattern Op, the diagnosis target pattern Dp is generated for each operating pattern Op to diagnose the plant 1.

Specifically, the operating pattern classification unit 52 associates each of the predetermined period's worth of the monitoring data D with an identifier of the operating pattern Op to classify the operating pattern Op of the plurality of monitoring data D. In this case, the above-described one record contains the measurement time, the monitoring data D, the power output data, and the operating pattern identifier. Further, the diagnosis target pattern generation unit 53 generates the diagnosis target pattern Dp for each operating pattern Op, using records having the same operating pattern identifier. The operating pattern Op includes at least one operating pattern Op, such as a first operating pattern Opa.

For instance, as long as the diagnosis target pattern Dp can be identified according to the operating pattern Op by symbol or color cording (see FIG. 8 described later), the diagnosis target pattern Dp is regarded as being formed for each operating pattern Op even if the diagnosis target patterns Dp of all operating patterns Op are represented together. In a case where the data is output to an output device such as a display, it may be able to output (display) only data associated with the operating pattern Op that is requested by the operator, or it may be able to output only the abnormal characteristic plot pattern Fx.

Figure 8:
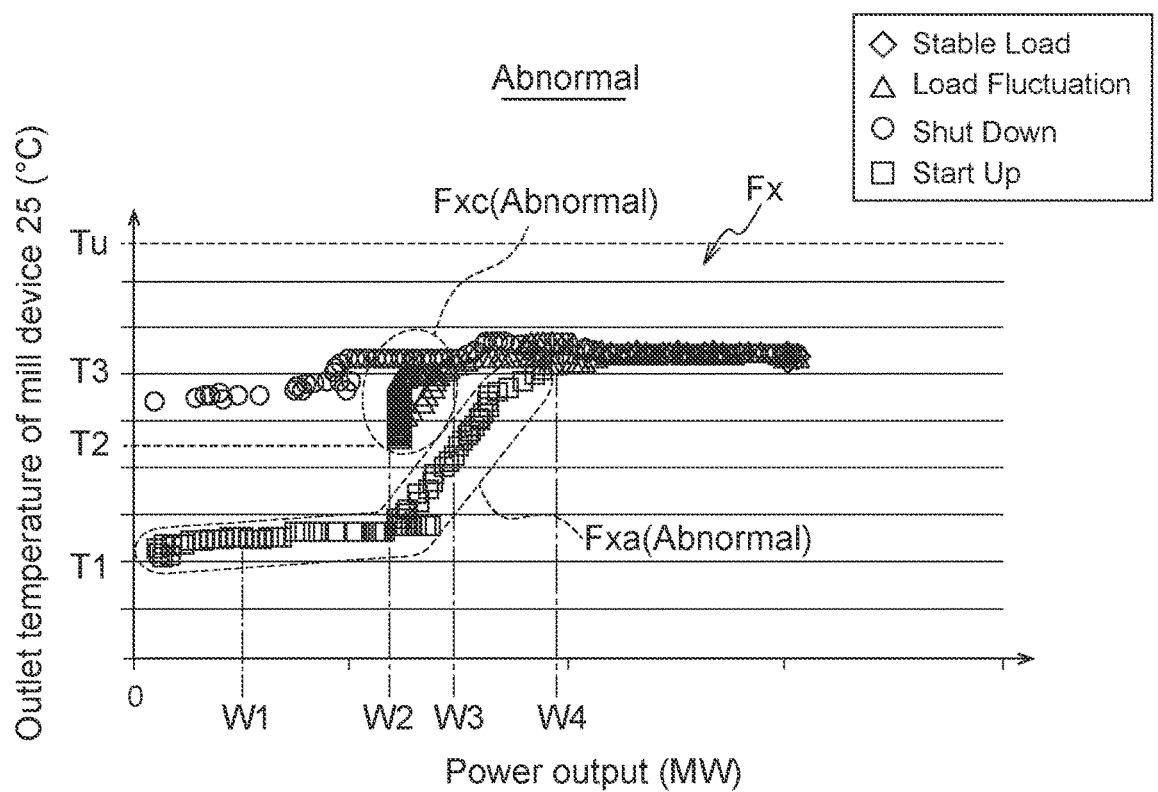
FIG. 8 is a diagram showing a diagnosis target pattern divided according to an operating pattern according to an embodiment of the present invention, in which the diagnosis target pattern of FIG. 5 is shown according to the operating pattern.
Figure 9:
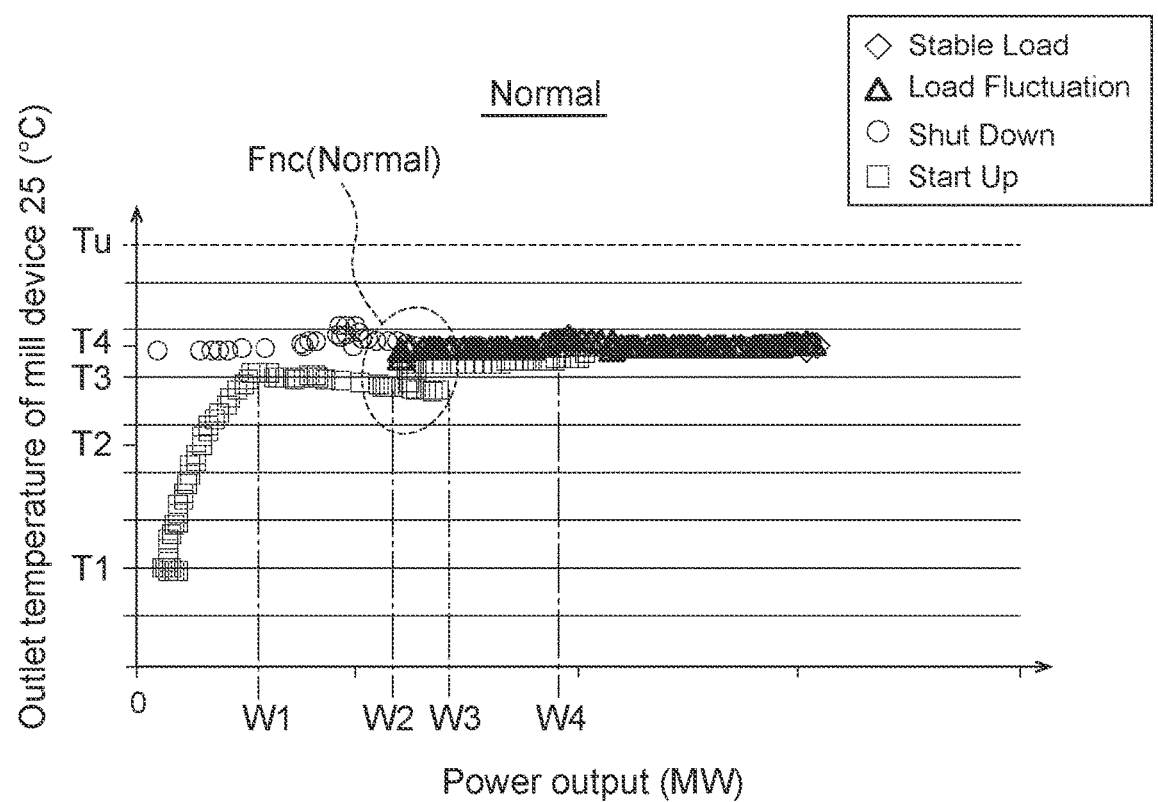

The operating pattern Op will be described with reference to FIGS. 8 and 9. FIG. 8 is a diagram showing the diagnosis target pattern Dp divided according to the operating pattern Op according to an embodiment of the present invention, in which the diagnosis target pattern Dp of FIG. 5 is shown by the operating pattern Op. FIG. 9 is a diagram showing a plot pattern at the normal time corresponding to the diagnosis target pattern of FIG. 8, in which FIG. 6 is shown according to the operating pattern. As shown in FIGS. 8 and 9, in some embodiments, the operating pattern Op may be set based on the operating state of the plant 1. In the embodiment shown in FIGS. 8 and 9, the operating pattern Op includes four operating patterns Op at start up, load fluctuation, stable load, and shut down of the plant 1. Further, the plurality of monitoring data D are classified according to the operating pattern Op, and diagnosis is performed based on the diagnosis target pattern Dp for each operating pattern Op. Thereby, it is possible to further improve the diagnosis accuracy.

More specifically, focusing only on the operating pattern Op at load fluctuation, as shown in FIG. 9, when the plant 1 is normal, the plot pattern F related to the outlet temperature of the mill device 25 has a plot pattern F (third normal pattern portion Fnc) including a pattern portion in which the temperature is slightly scattered around T4 when the power output (horizontal axis) is around W2, and a pattern portion in which the temperature is constant at about T4 when the power output is between W2 and W3.

By contrast, the diagnosis target pattern Dp of FIG. 8 has a plot pattern F (third abnormal pattern portion Fxc) shaped such that the outlet temperature has two values separated from each other against the same power output when the power output (vertical axis) is between W2 to W3 so as to form a surrounded space, which differs from the corresponding portion of the normal pattern Fn (FIG. 9). That is, with respect to the diagnosis target pattern Dp for the operating pattern Op at load fluctuation, it is possible to diagnose the diagnosis target pattern Dp related to the outlet temperature of the mill device 25 based on determination whether it has the third abnormal pattern portion Fxc.

However, in a case where the diagnosis target pattern Dp is not generated for each operating pattern Op, as shown in FIG. 5, although the shape similar to the abnormal characteristic plot pattern Fx divided into two parts forming the surrounded space is observed when the power output is between of W2 and W3, it cannot be determined whether this shape is formed only by the monitoring data D belonging to the operating pattern Op at load fluctuation. If the shape at the power output between W2 to W3 in FIG. 5 is formed by the monitoring data D belonging to the other operating pattern Op, diagnosis based on this shape may be wrongly classified as abnormal. Accordingly, diagnosis based on the diagnosis target pattern Dp for each operating pattern Op enables further improvement of the diagnosis accuracy.

Figure 10:
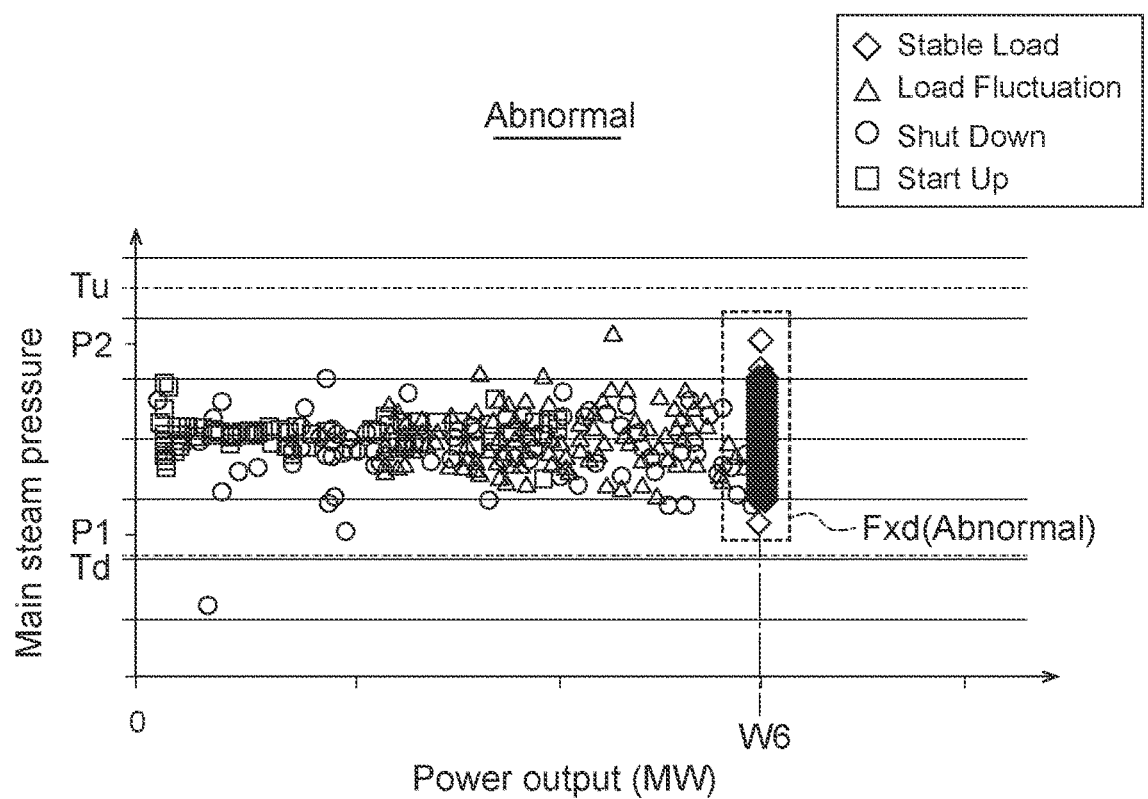
FIG. 10 shows an example of a diagnosis target pattern (at the abnormal time) of main steam pressure which is a parameter related to the operating state of a plant according to an embodiment of the present invention.

Another example of the diagnosis target pattern Dp for each operating pattern Op is shown in FIG. 10. FIG. 10 shows an example of the diagnosis target pattern (at the abnormal time) of main steam pressure which is a parameter related to the operating state of the plant 1 according to an embodiment of the present invention. That is, FIG. 10 shows the diagnosis target pattern Dp generated based on the monitoring data D of the main steam pressure at the abnormal time when some abnormality occurs in the plant 1. As shown in FIG. 10, the diagnosis target pattern Dp for the operating pattern Op at stable load has a liner plot pattern F (fourth abnormal pattern portion Fxd) in which the main steam pressure fluctuates in a range of P1 to P2 (P1<P2) when the power output is W6.

By contrast, in the normal pattern Fn related to the main steam pressure, the main steam pressure is constant during stable load period. In other words, if represented as in FIG. 10, the diagnosis target pattern Dp for the operating pattern Op at stable load has a point-like shape.

Meanwhile, the normal pattern Fn related to the main steam pressure has a liner plot pattern F at the power output with stable load (W6 in the example of FIG. 10) in the operating pattern Op other than stable load (see the operating pattern Op at load fluctuation or shut down in FIG. 10). Accordingly, also in the example of FIG. 10, in a case where the diagnosis target pattern Dp is not generated for each operating pattern Op, it cannot be determined whether the plot pattern F is generated by the monitoring data D belonging to the operating pattern Op at stable load even if the diagnosis target pattern Dp has the liner plot pattern when the power output is W6. Accordingly, if the monitoring data D is not classified according to the operating pattern Op, appropriate diagnosis cannot be performed.

However, the setting of the operating pattern Op is not limited to the above-described embodiment set based on the operating state of the plant 1. In some embodiments, the operating pattern Op may be set based on the operating state of a target device to be diagnosed. As shown in FIG. 1, generally, the plant 1 includes a plurality of devices (11 to 44 of FIG. 1 in case of the power generation plant), and the target devices may include at least one of the plurality of devices. More specifically, in the power generation plant, the target device is a device at least required to obtain power output. Basically, the target device includes all of the above-described devices in FIG. 1; however, the power generation plant may have a plurality of mill devices 25 and soot blowers 45 in proportion to the size of the plant, which are individually operated in accordance with power demand.

Thus, the operating pattern Op may be set based on combination of the operating states of the target devices, for instance, when one of the mill devices 25 is operated (first operating pattern Opa), two of the mill devices 25 are operated (second operating pattern Opb), and two of the mill devices 25 and the soot blower 45 are operated (third operating pattern Opc). However, the operating pattern Op does not have to include all combinations of the operating states of the target devices, and any combination may be extracted to set the operating pattern Op. Further, the operating pattern Op may be set based on the operating state of the target device and the operating state of the plant 1. Specifically, the operating pattern Op may include a first operating pattern Opa when the plant 1 starts up, a second operating pattern Opb when two of the mill devices 25 and the soot blower 45 are operated while the plant 1 is operating, and a third operating pattern Opc other than that. Further, the operating pattern Op may be set based on, in addition to the operating state of the target device or both the operating state of the target device and the operating state of the plant 1, at least one external environment including humidity and outside temperature.

In some embodiments, the operating pattern Op may be set based on the power output, for instance, equal to and more than 0 and less than 60 MW (first operating pattern Opa), equal to and more than 60 MW and less than 100 MW (second operating pattern Opb), and equal to and more than 100 MW (third operating pattern Opc). In some embodiments, the operating pattern Op may be set based on unit of the parameter such as temperature and pressure.

With the above configuration, abnormality of the plant 1 is diagnosed based on the plot pattern F for each operating pattern Op of the diagnosis target pattern Dp. By diagnosis based on the diagnosis target pattern Dp for each operating pattern Op, it is possible to avoid the plot pattern F formed of the operating pattern Op to be diagnosed being buried in the plurality of monitoring data D belonging to the other operating pattern Op, and it is possible to surely make the abnormal characteristic plot pattern Fx to appear. Thus, it is possible to further improve the diagnosis accuracy.

Further, in some embodiments, as shown in FIG. 2, the diagnosis device 5 further includes a threshold diagnosis unit 56 which diagnoses the plant 1 based on comparison between each of the plurality of monitoring data D and a threshold set for each operating pattern Op. That is, the threshold used by the threshold diagnosis unit 56 is the final control value for detecting abnormality. More specifically, the threshold diagnosis unit 56 may perform diagnosis based on only the upper limit threshold Tu and determine that the plant 1 is abnormal if at least one monitoring data D exceeding the upper limit threshold Tu is found (see FIGS. 3, 5, and 6). Further, the threshold diagnosis unit 56 may perform diagnosis based on both the upper limit threshold Tu and a lower limit threshold Td and determine that the plant 1 is abnormal if at least one monitoring data D exceeding the upper limit threshold Tu or falling below the lower limit threshold Td is found (see FIGS. 7 and 10). Further, the threshold (final control value), which is set for each parameter, may be set for each operating pattern Op or may be set in common to all operating patterns Op.

Further, the diagnosis device 5 may perform abnormality diagnosis by classifying the operating patterns Op of the plurality of monitoring data D and analyzing the monitoring data D for each operating pattern Op statistically. For instance, with respect to the temperature (parameter) of the main steam, histogram of frequency of the operating pattern Op at stable load, for instance at rated load operation may be formed, and a predetermined statistical value such as $2a$ ($a$: standard deviation) from the average of the main steam temperature may be set as the threshold (final control value). In this case, the threshold diagnosis unit 56 diagnoses abnormality if at least one measurement value (monitoring data D) deviated by the predetermined statistical value or more is found.

With the above configuration, it is possible to more reliably detect abnormality of the plant 1. That is, although the diagnosis by the pattern diagnosis unit 54 cannot detect abnormality until the abnormal characteristic plot pattern Fx is recognized as indicating abnormality even if the diagnosis target pattern Dp has the abnormal characteristic plot pattern Fx, the diagnosis by the threshold diagnosis unit 56 can detect such abnormality.

Further, in some embodiments, in the above-described embodiment including the threshold diagnosis unit 56, the diagnosis device 5 may further include a diagnosis target pattern storage unit 57 which stores the diagnosis target pattern generated for each operating pattern if the plant is not diagnosed as abnormal by the pattern diagnosis unit 54 but is diagnosed as abnormal by the threshold diagnosis unit 56.

That is, in a case where abnormality that cannot be detected at diagnosis by the pattern diagnosis unit 54 occurs, the storage device Md stores the diagnosis target pattern Dp (analysis-required diagnosis target pattern) in which abnormality is detected. By analyzing one or more analysis-required diagnosis target patterns thus accumulated, the pattern may be used for machine learning for increasing the diagnosis accuracy; for instance, an additional abnormal characteristic plot pattern Fx used for diagnosis by the pattern diagnosis unit 54 may be generated, or a control value (n-th control value or final control value) used for diagnosis by the threshold diagnosis unit 56 may be generated.

More specifically, the analysis-required diagnosis target pattern may be used as the abnormal characteristic plot pattern Fx, or may be used to generate the abnormal characteristic plot pattern Fx based on comparison with the normal pattern Fn. The abnormal characteristic plot pattern Fx (pattern portion) may be generated so as to have a characteristic common to a plurality of analysis-required diagnosis target patterns related to the same parameter. The plurality of analysis-required diagnosis target patterns related to the same parameter may be classified by a clustering technique (e.g., EM method), and an averaged pattern may be generated for each classified group to generate one or more abnormal characteristic plot patterns Fx. In this case, it can be expected that the abnormal characteristic plot pattern Fx corresponding to the cause of abnormality is generated. The above-described analysis may be performed on the analysis-required diagnosis target patterns related to multiple parameters.

Further, the diagnosis target pattern Dp diagnosed as normal may also be stored in the storage device Md to improve the diagnosis accuracy based on the normal pattern Fn. Further, the abnormal characteristic plot pattern Fx and the normal pattern Fn may be leaned by collecting a plurality of diagnosis target patterns Dp diagnosed as normal and a plurality of analysis-required diagnosis target patterns and classifying them according to some similarity by a clustering technique or the like.

With the above configuration, the diagnosis target pattern Dp with abnormality detected by the threshold diagnosis unit 56 but not detected by the pattern diagnosis unit 54 is stored (saved) in the storage device Md or the like. Thus, by learning the abnormal characteristic plot pattern Fx based on the diagnosis target pattern Dp through machine learning, for instance, it is possible to improve the diagnosis accuracy by the pattern diagnosis unit 54, and it is possible to improve the diagnosis accuracy for the plant 1.

Other functions of the diagnosis device 5 will now be described.

The above-described abnormal characteristic plot pattern Fx (see FIGS. 5, 7, 8, and 10) may appear in the diagnosis target pattern Dp as a corresponding cause of abnormality occurs in the plant 1. Accordingly, the abnormality cause may be estimated by storing a possible abnormality cause associated with the abnormal characteristic plot pattern Fx and identifying the abnormal characteristic plot pattern Fx of the diagnosis target pattern Dp. More specifically, the diagnosis device 5 may include a notification functional unit which indicates, in addition to a result as abnormal or normal, the abnormality cause associated with the abnormal characteristic plot pattern Fx on a display (output device) as a diagnosis result of the plant 1. Thus, by notifying the operator or the like of the abnormality cause, it is possible to rapidly perform inspection and recovery operation when abnormality is diagnosed.

Furthermore, by learning a device or a parameter strongly correlated to each abnormality cause through machine learning or the like, upon detection of abnormality, an effective operation to repair the abnormality into a normal state (e.g., adjustment of the operating state of devices, for instance, change of the number of operating mill devices 25) or a set indicated value of the parameter may be fed back to a control system remotely monitoring the plant 1. Thereby, it is possible to achieve optimum operation.

Although it has been described that, in a case where the diagnosis device 5 includes the operating pattern classification unit 52, the plurality of monitoring data D are classified according to the predetermined operating pattern Op of the plant 1, the predetermined operating pattern Op may be rewritten or newly defined in an optimum operating pattern Op more suitable for detecting abnormality through learning, such as machine learning. When the above-described kind of machine learning is performed, data classified according to the operating pattern Op in advance may be learned instead of the monitoring data D itself. This enables more effective learning with less noise.

Further, the diagnosis device 5 may have a graph generation function capable of representing the monitoring data D as time series and providing output (three-dimensional graph) in three axes of the measurement time, the monitoring data D, and the power output data (plant output data) based on the recode set upon diagnosis. Thus, it is possible to facilitate analysis of signs of abnormality and inspection at the abnormal time.

Further, the diagnosis device 5 may include a functional unit which estimates an operating facility of the plant 1 based on the monitoring data D. For instance, if it is determined that the diagnosis target pattern Dp generated using the acquired monitoring data D has the normal pattern Fn or the abnormal characteristic plot pattern Fx for each operating pattern Op set based on the target device, it is possible to automatically estimate the configuration of the device based on the content of the operating pattern Op. More specifically, if the content of the operating pattern Op is that two of the mill devices 25 and the soot blower 45 are under operation, such configuration of the devices is estimated.

At least one of the above functions may be implemented in the diagnosis method for the plant 1 described below.

Figure 11:
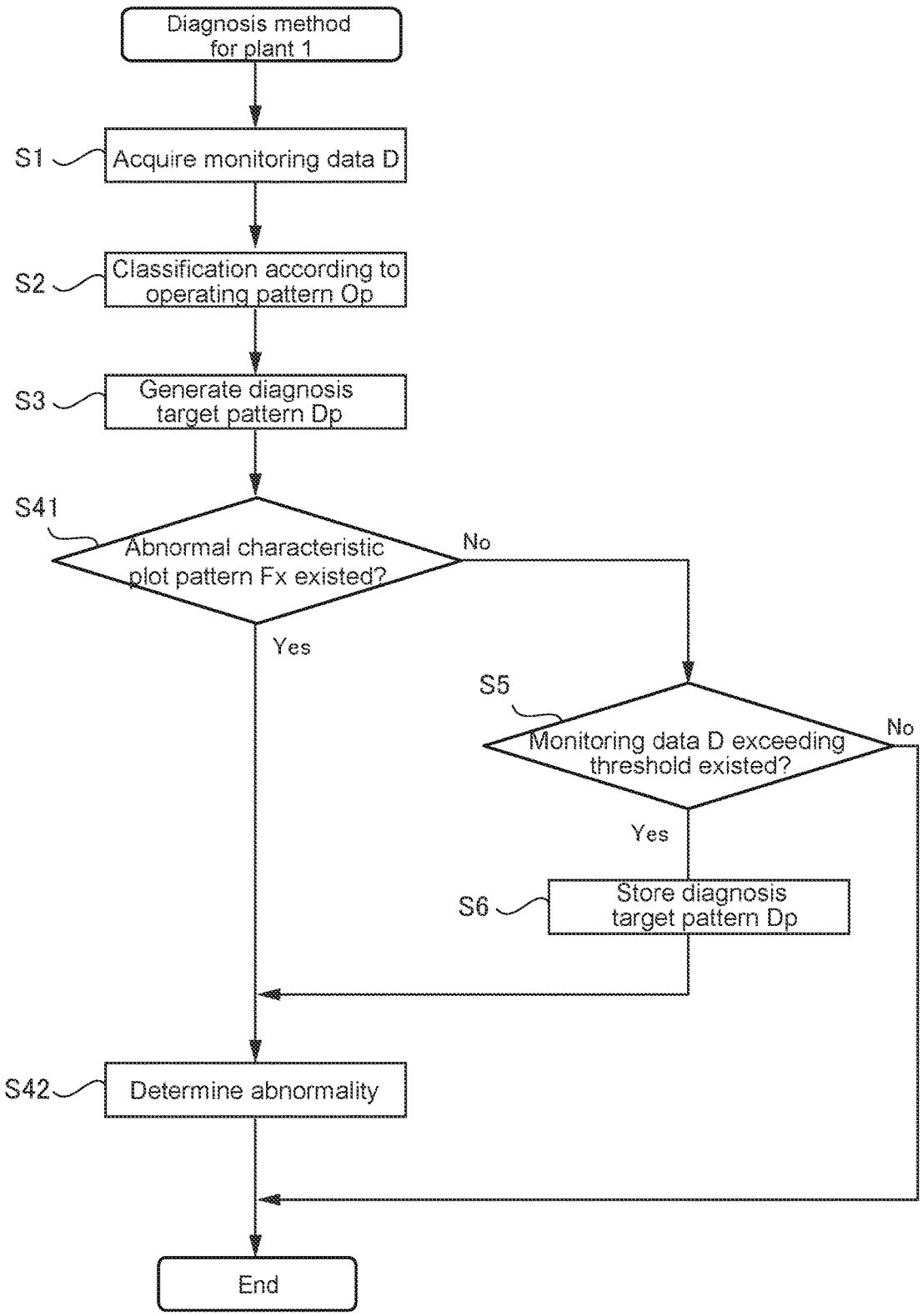
FIG. 11 is a diagram of a diagnosis method for a plant according to an embodiment of the present invention.

Hereinafter, the diagnosis method for the plant 1 corresponding to the above-described diagnosis device 5 will be described with reference to FIG. 11. FIG. 11 is a diagram of the diagnosis method for the plant 1 according to an embodiment of the present invention. The diagnosis method for the plant 1 is a method for diagnosing the plant 1 based on the operating state of the plant 1, and includes a monitoring data acquisition step (S1), a diagnosis target pattern generation step (S2), and a pattern diagnosis step (S4), as shown in FIG. 11. By performing this diagnosis method, it is possible to detect abnormality occurring in the plant 1. The diagnosis method may be performed by the diagnosis device 5 or the diagnosis program, or may be performed artificially by a person who monitors the plant 1 with a computer.

The diagnosis method for the plant 1 will now be described in the order of steps shown in FIG. 11. Since each step of FIG. 11 corresponds to the functional unit with the similar name as described above, the detailed description will be omitted.

In step S1 of FIG. 11, the monitoring data acquisition step is performed to acquire the plurality of monitoring data D. In the present embodiment, in step S2, the monitoring data classification step is performed to classify each of the plurality of monitoring data D according to the operating pattern Op. However, this step may be omitted. In the next step S3, the diagnosis target pattern generation step is performed to generate the diagnosis target pattern Dp based on the plurality of monitoring data D (measurement values of the same parameter) acquired in the monitoring data acquisition step (S1). In the present embodiment, since the monitoring data classification step (S2) is performed, in step S3, the diagnosis target pattern Dp is generated for each operating pattern Op. Then, in step S4, the pattern diagnosis step is performed to diagnose the plant 1 based on the plot pattern F of the diagnosis target pattern Dp.

As shown in FIG. 11, in some embodiments, in the pattern diagnosis step (S4), an abnormality diagnosis step (S41) may be performed. More specifically, in step S41, it is determined whether the diagnosis target pattern Dp has the abnormal characteristic plot pattern Fx. If it is determined that the diagnosis target pattern Dp has the abnormal characteristic plot pattern Fx, in step S42, it is determined that the plant 1 is abnormal. For instance, it may be determined that the diagnosis target pattern Dp has the abnormal characteristic plot pattern Fx if the diagnosis target pattern Dp has a plot pattern F with at least a predetermined degree of similarity to the abnormal characteristic plot pattern Fx.

Conversely, in step S41, if it is determined that the diagnosis target pattern Dp does not have the abnormal characteristic plot pattern Fx, as shown in FIG. 11, a threshold diagnosis step (S5) may be performed to diagnose the plant 1 based on comparison between the plurality of monitoring data D for each operating pattern Op and the threshold set for each operating pattern Op. Specifically, in step S5, it is determined whether monitoring data D exceeding the threshold is contained in the plurality of monitoring data D, and if the monitoring data D that exceeds the threshold is contained, it is determined that abnormality is present (the method returns to S42). As shown in FIG. 11, in step S6 between step S5 and step S42, a diagnosis target pattern storage step may be performed to store the diagnosis target pattern Dp generated for each operating pattern Op, and then step S42 may be performed to determine abnormality. Conversely, if it is determined that the monitoring data D exceeding the threshold is not contained, the diagnosis flowchart ends.

The diagnosis method may further include a normality determination step of determining that the diagnosis target pattern Dp is normal if the diagnosis target pattern Dp has a plot pattern F with at least a predetermined degree of similarity to the normal pattern Fn. The normality determination step may be performed between step S3 and step S41, or may be performed between step S41 and step S5 in FIG. 11. If it is diagnosed as normal in the normality determination step, the diagnosis flowchart ends; otherwise, the subsequent step will be performed.

Embodiments of the present invention were described in detail above, but the present invention is not limited thereto, and various amendments and modifications may be implemented.

REFERENCE SIGNS LIST

1 Plant
11 Main transformer
12 Switch gear
13 Transmission line
14 Duct
15 Denitration device
16 Electric precipitator
17 Induced draft fan
18 Desulfurization device
19 Stack
M Drive motor
2 Boiler
21 Coal yard
22 Conveyor belt
23 Coal bunker
24 Coal feeder
25 Mill device
26 Pulverized coal pipe
27 Burner
28 Forced draft fan
29 Secondary air supply pipe
3 Steam turbine
31 Condenser
31p Water supply pipe
32 Generator
33 Circulation pump
34 Cooling water channel
35 Condensate pump
36 Low-pressure water supply heater
37 Deaerator
38 Water supply pump
39 High-pressure water supply heater
41 Heat-transfer tube
42 Main steam pipe
43 Re-heater
44 Re-heat pipe
45 Soot blower
46 Clinker hopper
47 Ash processing facility
5 Diagnosis device
51 Monitoring data acquisition unit
52 Operating pattern classification unit
53 Diagnosis target pattern generation unit
54 Pattern diagnosis unit
55 Abnormality diagnosis unit
56 Threshold diagnosis unit
57 Diagnosis target pattern storage unit
Md Storage device
D Monitoring data
Dp Diagnosis target pattern
F Plot pattern
Fx Abnormal characteristic plot pattern
Fxa First abnormal pattern portion
Fxb Second abnormal pattern portion
Fxc Third abnormal pattern portion
Fxd Fourth abnormal pattern portion
Fn Normal pattern
Fna First normal pattern portion
Fnc Third normal pattern portion
Op Operating pattern
Opa First operating pattern
Opb Second operating pattern
Opc Third operating pattern
Tu Upper limit threshold
Td Lower limit threshold
Ts Control value

The invention claimed is:

1. A diagnosis device for diagnosing a plant based on an operating state of the plant, comprising:
a memory configured to store a program; and
a processor configured to execute the program and control the diagnosis device to:
acquire a plurality of monitoring data which are measurement values of a parameter related to the operating state of the plant, the plurality of monitoring data being measured at different times;

generate a diagnosis target pattern that is a plot pattern where each of the plurality of monitoring data is plotted against plant output data of the plant; and diagnose the plant by comparing the plot pattern of the diagnosis target pattern with a plot pattern of the plant in a normal state, each of the plot patterns being an overall shape of plots.

2. The diagnosis device according to claim 1, wherein the processor is further configured to execute the program and control the diagnosis device to diagnose the plant as abnormal if it is determined that the diagnosis target pattern has a predetermined abnormal characteristic plot pattern that is a specific plot pattern by which abnormality of the plant is identifiable.

3. The diagnosis device according to claim 2, wherein the processor is further configured to execute the program and control the diagnosis device to determine that the diagnosis target pattern has the abnormal characteristic plot pattern if the diagnosis target pattern has a plot pattern with at least a predetermined degree of similarity to the abnormal characteristic plot pattern.

4. The diagnosis device according to claim 1, wherein the processor is further configured to execute the program and control the diagnosis device to classify each of the plurality of monitoring data according to a predetermined operating pattern of the plant,
and to generate the diagnosis target pattern for each operating pattern.

5. The diagnosis device according to claim 4, wherein the processor is further configured to execute the program and control the diagnosis device to diagnose the plant based on comparison between each of the plurality of monitoring data and a threshold.

6. The diagnosis device according to claim 5, wherein the processor is further configured to execute the program and control the diagnosis device to store the diagnosis target pattern generated for each operating pattern if the plant is not diagnosed as abnormal by pattern diagnosis but is diagnosed as abnormal by threshold diagnosis.

7. The diagnosis device according to claim 4, wherein the plant includes a plurality of devices, and wherein the operating pattern is set based on an operating state of a target device including at least one of the plurality of devices.

8. The diagnosis device according to claim 1, wherein the plant is a power generation plant including a generator.

9. A diagnosis method for diagnosing a plant based on an operating state of the plant, comprising:
a monitoring data acquisition step of acquiring a plurality of monitoring data which are measurement values of a parameter related to the operating state of the plant, the plurality of monitoring data being measured at different times;

a diagnosis target pattern generation step of generating a diagnosis target pattern that is a plot pattern obtained by plotting each of the plurality of monitoring data against plant output data of the plant; and a pattern diagnosis step of diagnosing the plant by comparing the plot pattern of the diagnosis target pattern with a plot pattern of the plant in a normal state, each of the plot patterns being an overall shape of plots.

10. The diagnosis method according to claim 9, wherein the pattern diagnosis step includes an abnormality diagnosis step of diagnosing the plant as abnormal if it is determined that the diagnosis target pattern has a predetermined abnormal characteristic plot pattern that is a specific plot pattern by which abnormality of the plant is identifiable.

11. The diagnosis method according to claim 10, wherein the abnormality diagnosis step includes determining that the diagnosis target pattern has the abnormal characteristic plot pattern if the diagnosis target pattern has a plot pattern with at least a predetermined degree of similarity to the abnormal characteristic plot pattern.

12. The diagnosis method according to claim 9, further comprising a monitoring data classification step of classifying each of the plurality of monitoring data according to a predetermined operating pattern of the plant,
wherein the diagnosis target pattern generation step includes generating the diagnosis target pattern for each operating pattern.

13. The diagnosis method according to claim 12, further comprising a threshold diagnosis step of diagnosing the plant based on comparison between each of the plurality of monitoring data and a threshold.

14. The diagnosis method according to claim 13, further comprising a diagnosis target pattern storage step of storing the diagnosis target pattern generated for each operating pattern if the plant is not diagnosed as abnormal in the pattern diagnosis step but is diagnosed as abnormal in the threshold diagnosis step.

15. The diagnosis method according to claim 12, wherein the plant includes a plurality of devices, and wherein the operating pattern is set based on an operating state of a target device including at least one of the plurality of devices.

16. The diagnosis method according to claim 9, wherein the plant is a power generation plant including a generator.

* * * * *